US012598538B2

(12) United States Patent
Chen et al.

(10) Patent No.: US 12,598,538 B2
(45) Date of Patent: Apr. 7, 2026

(54) UNIFIED ACCESS CONTROL

(71) Applicant: Apple Inc., Cupertino, CA (US)

(72) Inventors: Yuqin Chen, Beijing (CN); Alexander Sirotkin, Tel Aviv (IL); Fangli Xu, Beijing (CN); Haijing Hu, Los Gatos, CA (US); Mona Agnel, Uxbridge (GB); Naveen Kumar R. Palle Venkata, San Diego, CA (US); Pavan Nuggehalli, San Carlos, CA (US); Ralf Rossbach, Munich (DE); Sarma V. Vangala, Campbell, CA (US); Sethuraman Gurumoorthy, San Ramon, CA (US); Sudeep Manithara Vamanan, Nuremberg (DE); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 453 days.

(21) Appl. No.: 17/802,803

(22) PCT Filed: Sep. 24, 2021

(86) PCT No.: PCT/CN2021/120404
§ 371 (c)(1),
(2) Date: Aug. 26, 2022

(87) PCT Pub. No.: WO2023/044784
PCT Pub. Date: Mar. 30, 2023

(65) Prior Publication Data
US 2024/0205796 A1 Jun. 20, 2024

(51) Int. Cl.
*H04W 48/02* (2009.01)
*H04W 4/50* (2018.01)

(52) U.S. Cl.
CPC ............. *H04W 48/02* (2013.01); *H04W 4/50* (2018.02)

(58) Field of Classification Search
CPC ........ H04W 48/02; H04W 48/00; H04W 4/50
(Continued)

(56) References Cited

U.S. PATENT DOCUMENTS

2018/0124685 A1* 5/2018 Jha ........................... H04W 4/70
2019/0045577 A1* 2/2019 Kim ....................... H04W 4/90
(Continued)

FOREIGN PATENT DOCUMENTS

CN 112136299 12/2020
CN 112889344 A 6/2021
(Continued)

OTHER PUBLICATIONS

Discussion of the MINT Solutions #38 and #40, Lenovo, 3GPP TSG RAN WG2 Meeting #115-e R2-2107264, Aug. 16-27, 2021, 7 pages.
(Continued)

*Primary Examiner* — Qutbuddin Ghulamali
(74) *Attorney, Agent, or Firm* — Kilpatrick Townsend & Stockton LLP

(57) ABSTRACT

Provided is a method by a user equipment (UE), comprising: receiving, from a base station (BS), one or more messages providing different barring configurations for different access identities in an access identity set, the UE has at least one access identity, and the at least one access identity is from the access identity set and indicates that the UE is a disaster inbound roamer with respect to the BS; and performing, by the UE, an access barring check based on the one or more messages.

11 Claims, 10 Drawing Sheets

(58) Field of Classification Search
USPC .......................................................... 455/411
See application file for complete search history.

(56) References Cited

U.S. PATENT DOCUMENTS

| | | | |
|---|---|---|---|
| 2021/0144618 A1 | 5/2021 | Chun | |
| 2021/0153027 A1 | 5/2021 | Gupta | |

FOREIGN PATENT DOCUMENTS

| | | |
|---|---|---|
| KR | 20200114437 | 10/2020 |
| WO | 2021025432 A1 | 2/2021 |
| WO | 2022099242 A1 | 5/2022 |

OTHER PUBLICATIONS

Report of email discussion [AT 115-e][031][NR17] MINT, Nokia, 3GPP TSG-RAN WG2 Meeting #115 Electronic R2-2109058, Aug. 30, 2021, 16 pages.
UAC enhancements for minimization of service interruption when disaster condition applies, Vivo, 3GPP TSG-RAN WG2 Meeting #115 electronic R2-2107841, Aug. 16-27, 2021, 4 pages.
International Patent Application No. PCT/CN2021/120404, International Search Report and Written Opinion, Mailed on Apr. 25, 2022, 9 pages.
3rd Generation Partnership Project; Technical Specification Group Core Network and Terminals; Study on the support for minimization of service interruption (Release 17), 3GPP TR 24.811 V2.0.0, Jun. 2021, 112 pages.
International Patent Application No. PCT/CN2021/120404, International Preliminary Report on Patentability, Apr. 4, 2024, 5 pages.
Further Consideration on AS/NAS Modeling for Unified Access Control, 3rd Generation Partnership Project, Technical Specification Group Radio Access Network, Working Group2 Meeting#101bis, R2-1804451, Apr. 16-20, 2018, 3 pages.
China Patent Application No. 202180019701.8, Office Action, Aug. 2, 2025, 18 pages.
3rd Generation Partnership Project; Technical Specification Group Core Network and Terminals; Study on the support for minimization of service interruption; (Release 17), 3rd Generation Partnership Project TR 24.811, V17.1.0, Sep. 2021, 112 pages.
Adding the Functionality on MINT, LG Electronics, 3rd Generation Partnership Project, Technical Specification Group, Working Group2, Meeting #146E, e-meeting, S2-2106659, Aug. 16-27, 2021, 15 pages.
Considerations on the UAC Enhancements when Disaster Condition Applies, Samsung, 3rd Generation Partnership Project, Technical Specification Group, Radio Access Network 2, Meeting #115 Electronic, R2- 2108633, Aug. 9-27, 2021, 4 pages.
RAN2 Aspects for MINT, Ericsson, 3rd Generation Partnership Project, Technical Specification Group; Radio Access Network, Working Group2 #115e Electronic meeting, R2-2108366, Aug. 16-27, 2021, 4 pages.
European Patent Application No. 21957910.9, Extended European Search Report, May 19, 2025, 15 pages.
China Patent Application No. 202180019701.8, Notice of Decision to Grant, Jan. 9, 2026, 6 pages.

* cited by examiner

<u>300</u>

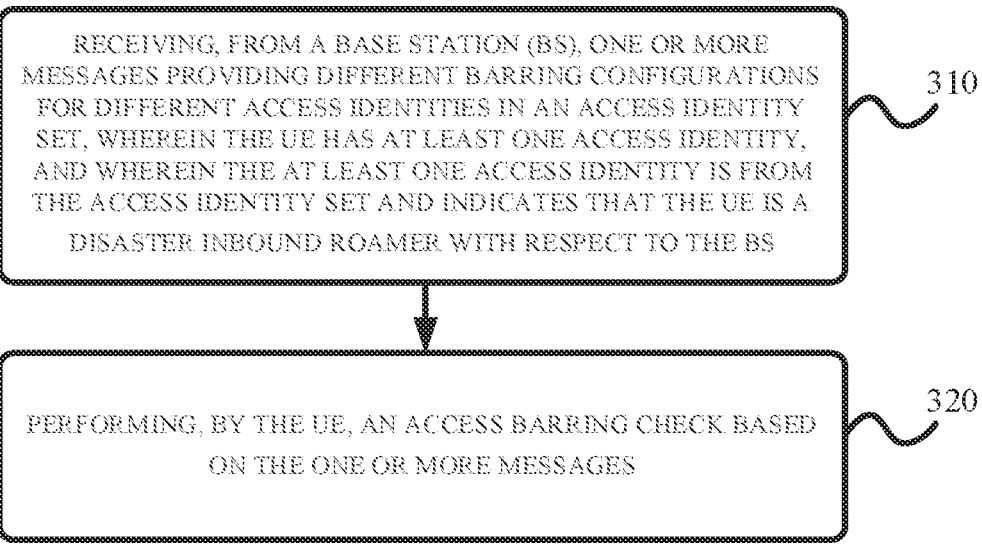

RECEIVING, FROM A BASE STATION (BS), ONE OR MORE MESSAGES PROVIDING DIFFERENT BARRING CONFIGURATIONS FOR DIFFERENT ACCESS IDENTITIES IN AN ACCESS IDENTITY SET, WHEREIN THE UE HAS AT LEAST ONE ACCESS IDENTITY, AND WHEREIN THE AT LEAST ONE ACCESS IDENTITY IS FROM THE ACCESS IDENTITY SET AND INDICATES THAT THE UE IS A DISASTER INBOUND ROAMER WITH RESPECT TO THE BS                    310

PERFORMING, BY THE UE, AN ACCESS BARRING CHECK BASED ON THE ONE OR MORE MESSAGES                    320

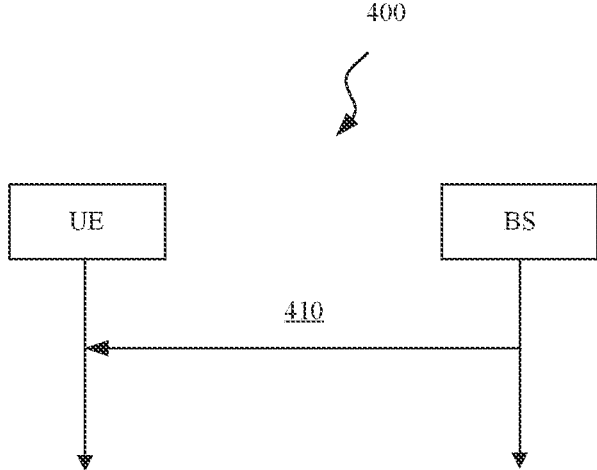

FIG. 4

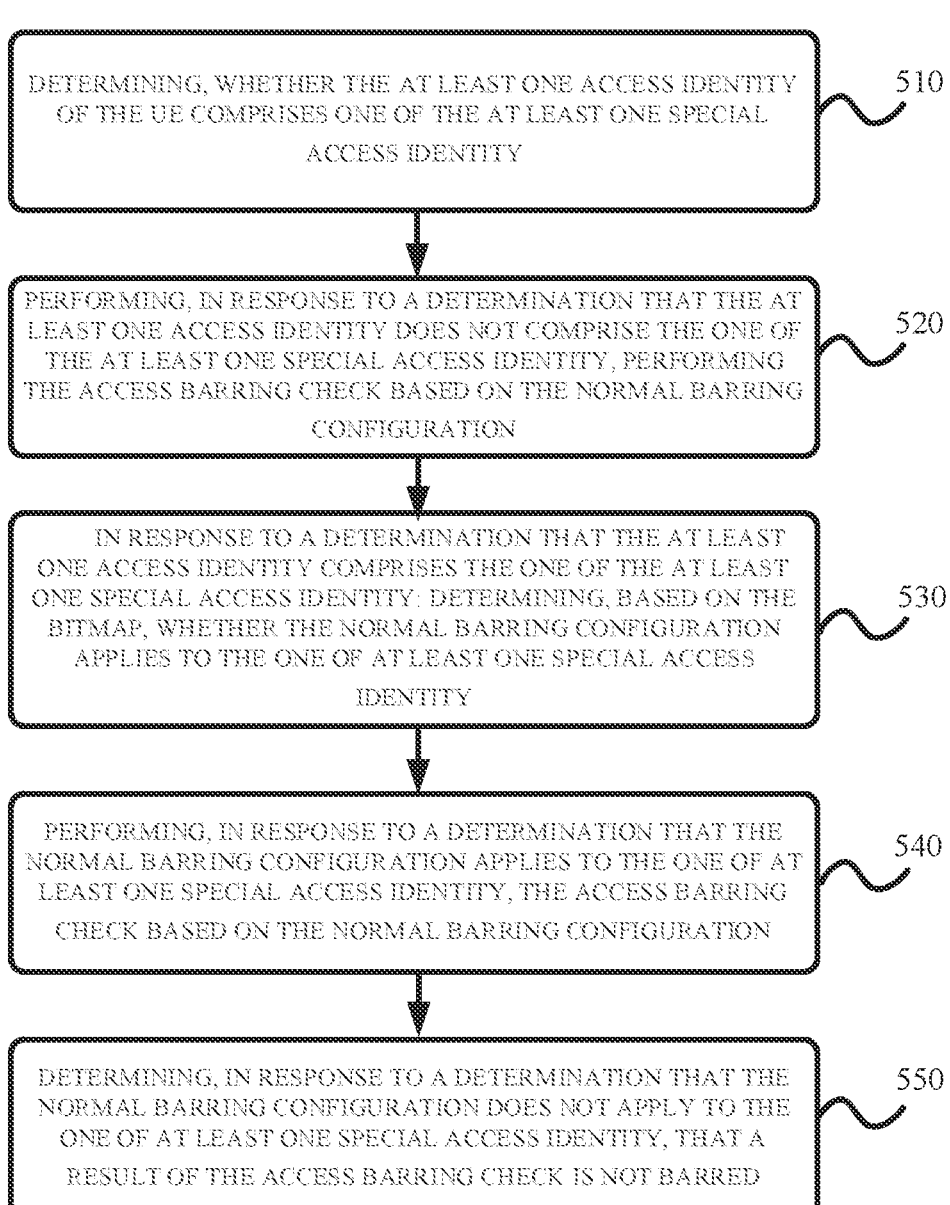

500

DETERMINING, WHETHER THE AT LEAST ONE ACCESS IDENTITY OF THE UE COMPRISES ONE OF THE AT LEAST ONE SPECIAL ACCESS IDENTITY   510

PERFORMING, IN RESPONSE TO A DETERMINATION THAT THE AT LEAST ONE ACCESS IDENTITY DOES NOT COMPRISE THE ONE OF THE AT LEAST ONE SPECIAL ACCESS IDENTITY, PERFORMING THE ACCESS BARRING CHECK BASED ON THE NORMAL BARRING CONFIGURATION   520

IN RESPONSE TO A DETERMINATION THAT THE AT LEAST ONE ACCESS IDENTITY COMPRISES THE ONE OF THE AT LEAST ONE SPECIAL ACCESS IDENTITY: DETERMINING, BASED ON THE BITMAP, WHETHER THE NORMAL BARRING CONFIGURATION APPLIES TO THE ONE OF AT LEAST ONE SPECIAL ACCESS IDENTITY   530

PERFORMING, IN RESPONSE TO A DETERMINATION THAT THE NORMAL BARRING CONFIGURATION APPLIES TO THE ONE OF AT LEAST ONE SPECIAL ACCESS IDENTITY, THE ACCESS BARRING CHECK BASED ON THE NORMAL BARRING CONFIGURATION   540

DETERMINING, IN RESPONSE TO A DETERMINATION THAT THE NORMAL BARRING CONFIGURATION DOES NOT APPLY TO THE ONE OF AT LEAST ONE SPECIAL ACCESS IDENTITY, THAT A RESULT OF THE ACCESS BARRING CHECK IS NOT BARRED   550

DETERMINING, BASED ON THE AT LEAST ONE ACCESS IDENTITY, AT LEAST ONE CORRESPONDING BARRING CONFIGURATION — 610

PERFORMING THE ACCESS BARRING CHECK BASED ON THE AT LEAST ONE CORRESPONDING BARRING CONFIGURATION — 620

700

UE

BS

<u>710</u>

<u>720</u>

<u>730</u>

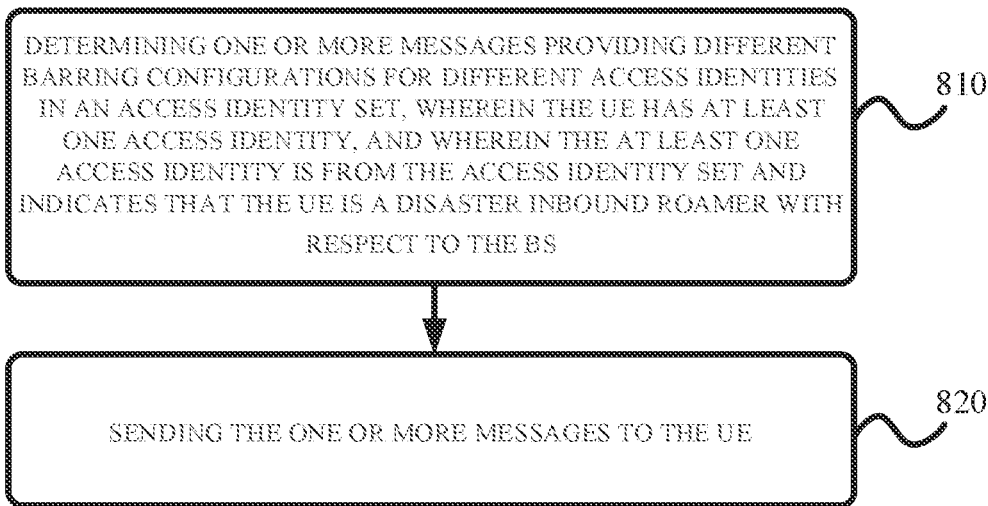

800

DETERMINING ONE OR MORE MESSAGES PROVIDING DIFFERENT
BARRING CONFIGURATIONS FOR DIFFERENT ACCESS IDENTITIES
IN AN ACCESS IDENTITY SET, WHEREIN THE UE HAS AT LEAST
ONE ACCESS IDENTITY, AND WHEREIN THE AT LEAST ONE
ACCESS IDENTITY IS FROM THE ACCESS IDENTITY SET AND
INDICATES THAT THE UE IS A DISASTER INBOUND ROAMER WITH
RESPECT TO THE BS                                          810

SENDING THE ONE OR MORE MESSAGES TO THE UE               820

FIG. 8

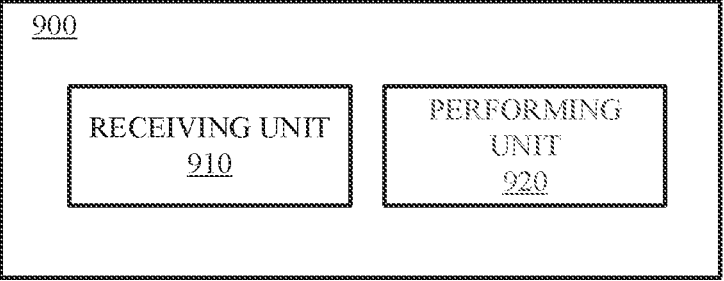

900

| RECEIVING UNIT | PERFORMING |
| 910 | UNIT |
| | 920 |

FIG. 9

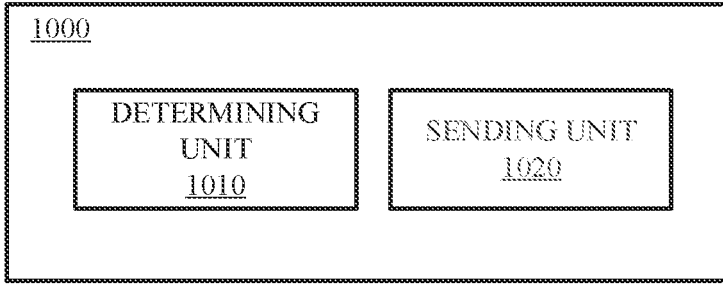

1000

| DETERMINING | SENDING UNIT |
| UNIT | 1020 |
| 1010 | |

FIG. 10

UNIFIED ACCESS CONTROL

CROSS REFERENCE TO RELATED APPLICATION

This application is a 371 U.S. National Phase of PCT International Patent Application No. PCT/CN2021/120404, filed Sep. 24, 2021, which is herein incorporated by reference in its entirety for all purposes.

TECHNICAL FIELD

This application relates generally to wireless communication systems, and more specifically to unified access control.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard: the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method by a user equipment (UE) is provided that comprises receiving, from a base station (BS), one or more messages providing different barring configurations for different access identities in an access identity set, wherein the UE has at least one access identity, and wherein the at least one access identity is from the access identity set and indicates that the UE is a disaster inbound roamer with respect to the BS: and performing, by the UE, an access barring check based on the one or more messages.

According to an aspect of the present disclosure, a method by a base station (BS) is provided that comprises determining one or more messages providing different barring configurations for different access identities in an access identity set, wherein the UE has at least one access identity, and wherein the at least one access identity is from the access identity set and indicates that the UE is a disaster inbound roamer with respect to the BS: and sending the one or more messages to the UE.

According to an aspect of the present disclosure, an apparatus for a user equipment (UE), the apparatus comprises one or more processors configured to perform steps of the method according to any of methods by the UE provided herein.

According to an aspect of the present disclosure, an apparatus for a base station (BS), the apparatus comprises one or more processors configured to perform steps of the method according to any of methods by the BS provided herein.

According to an aspect of the present disclosure, a computer readable medium having computer programs stored thereon which, when executed by one or more processors, cause an apparatus to perform steps of the method according to any of methods provided herein.

According to an aspect of the present disclosure, an apparatus for a communication device, comprising means for performing steps of the method according to any of methods provided herein.

According to an aspect of the present disclosure, a computer program product comprising computer programs which, when executed by one or more processors, cause an apparatus to perform steps of the method according to any of methods provided herein.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 3 illustrates a flowchart for a method by a UE in accordance with some embodiments.

FIG. 4 illustrates a transmit scenario with access barring information between a UE and a BS in accordance with some embodiments.

FIG. 5 illustrates a flowchart for a method of performing access barring check as illustrated in FIG. 3 in accordance with some embodiments.

FIG. 8 illustrates a flowchart for a method by a BS in accordance with some embodiments.

FIG. 9 illustrates a block diagram of an apparatus for a UE in accordance with some embodiments.

FIG. 10 illustrates a block diagram of an apparatus for a BS in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

Access control is a solution to congestion control on a network side. Access control barring (ACB) is a general term for access control in a long term evolution (LTE) system, and unified access control (UAC) is a general term for access control is a fifth generation (5G) mobile communication system, the LTE system, and a 5G core network (5GC). When load on the network side is relatively heavy, an access control mechanism may be used to bar some terminals from initiating access, to restrict the network load.

In the related techniques, an access control method is to configure parameters of an access category (AC) and an access identity (AI) in a UAC broadcast parameter. The user equipment then maps an access attempt to the AC, and maps a UE configuration to the access identity, and whether access of the UE is barred is determined based on the UAC parameter.

Figure 1:
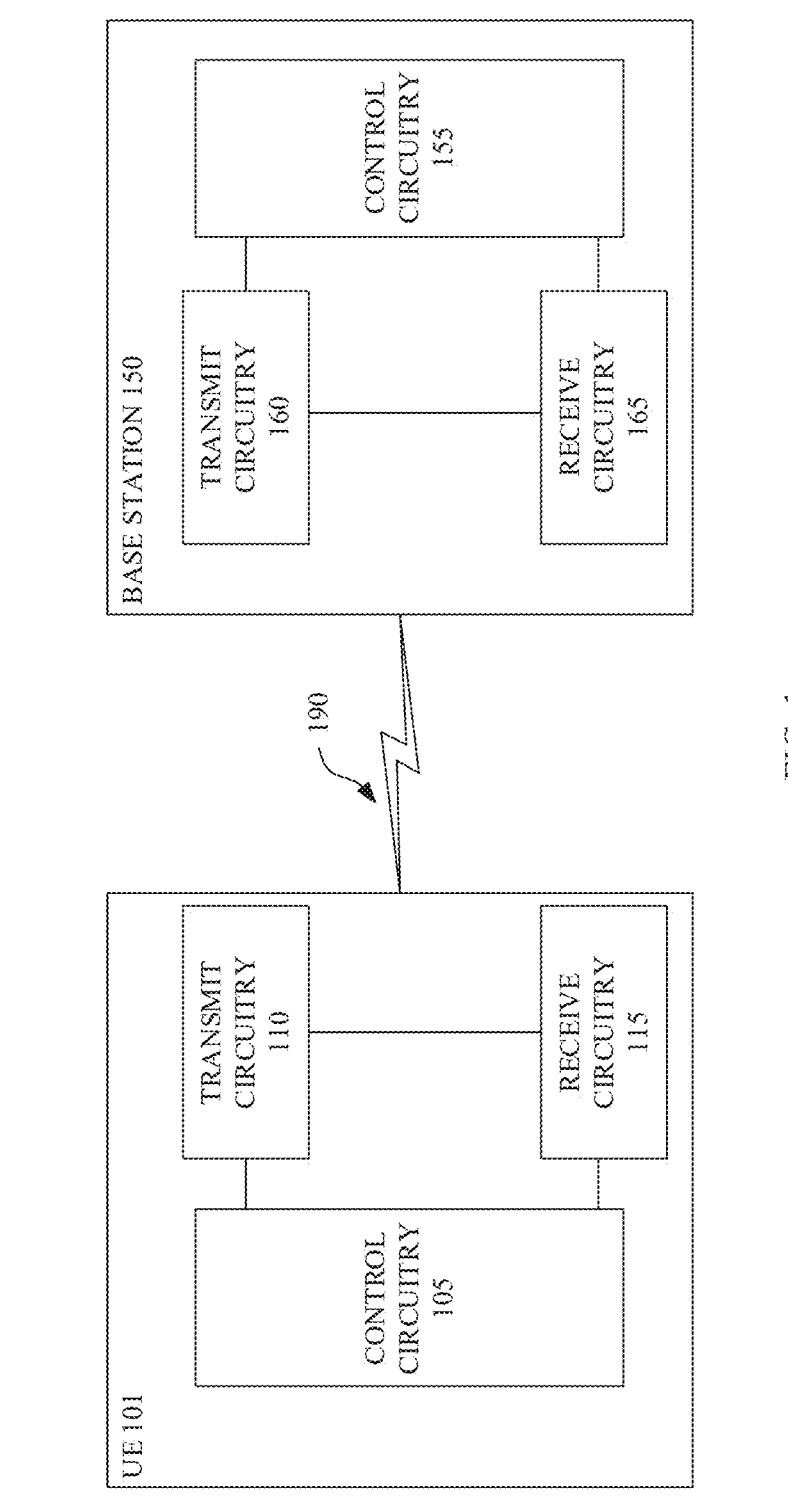
FIG. 1 is a block diagram of a system including a base station (BS) and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

Figure 2:
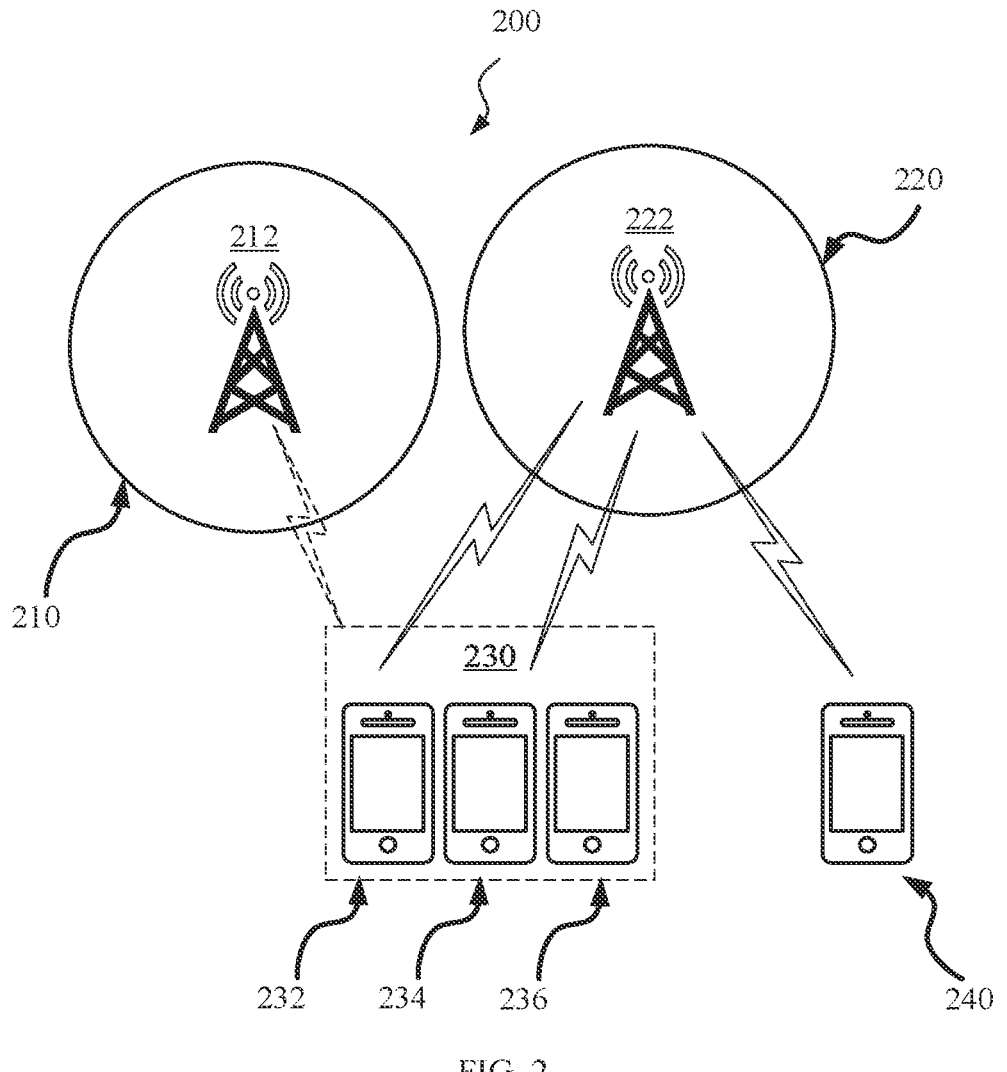
FIG. 2 illustrates an application scenario in accordance with some embodiments.

FIG. 2 illustrates an application scenario 200 in accordance with some embodiments. As shown in FIG. 2, public land mobile network (PLMN) 210 may comprise base station (BS) 212, access and mobility management function 1 (AMF1), session management function 1 (SMF1), user plane function 1 (UPF1), policy control function 1 (PCF1), network exposure function 1 (NEF1), unified data management 1 (UDM1), operation administration and maintenance 1 (OAM1) and/or other network functions. PLMN 220 may comprise BS 222, AMF2, SMF2, UPF2, PCF2, NEF2, UDM2 and/or other network functions. In an example, a plurality of wireless devices 230 may subscribe to the PLMN 210. For example, UE 232, UE 234 and UE 236 are subscribed to the PLMN 210. UE 232, 234 and 236 may on barringFactor and barringTime for each access category for the MINT UE. During the access barring check, if the UE NAS layer provides AI3 to the UE RRC layer, the UE RRC layer decides whether the access attempt is allowed or not based on the value of the barring factor for AI3 and a random number drawn. An implementation for Solution #38 is shown below:

```
uac-BarringInfo-MINT                    SEQUENCE {
uac-BarringForCommon-MINT                   UAC-BarringPerCatList-MINT
}
UAC-BarringPerCatList-MINT ::=              SEQUENCE (SIZE (1..maxAccessCat-1)) OF
UAC-BarringPerCat-MINT
UAC-BarringPerCat-MINT ::=                  SEQUENCE { accessCategory
INTEGER (1..maxAccessCat-1),
uac-barringInfoSetIndex-MINT                UAC-BarringInfoSetIndex-MINT
}
UAC-BarringInfoSetList-MINT ::=             SEQUENCE (SIZE(1..maxBarringInfoSet)) OF
UAC-BarringInfoSet-MINT
UAC-BarringInfoSet-MINT ::=             SEQUENCE {
uac-BarringFactor                       ENUMERATED {p00, p05, p10, p15, p20, p25, p30, p40,
p50, p60, p70, p75, p80, p85, p90, p95},
uac-BarringTime                         ENUMERATED {s4, s8, s16, s32, s64, s128, s256, s512},
}.
``` register to the home PLMN (e.g., PLMN 210) firstly, and access to an application server through BS 212 of PLMN 210.

In some cases, due to a disaster and other problems, BS 212 may not be able to provide connectivity to the wireless devices 230. In some implementations, PLMN 220 may broadcast System Information Block Type1 (SIB1), indicating disaster roaming is offered for PLMN 210. Wireless devices 230 may select PLMN 220 and try to register to the PLMN 220. As a result, PLMN 220 cells in the disaster area would see increased access attempts by the disaster inbound roamers (e.g., UE 232, 234 and 236). The disaster inbound roamers may also be called as minimization of service interruption UE (MINT UE) in the access control. In some examples, UE 240 may subscribe to PLMN 220. Due to the overwhelming access attempts from the MINT UE 232, 234 and 236, the services provided by PLMN 220 to UE 240 may be impacted.

It is important for the PLMN 220 providing disaster roaming to avoid degradation of service levels to its own subscribers UE 240 due to the activities of incoming MINT UEs 232, 234 and 236. For this reason, the network 222 needs a method by which it can set differential access barring levels for own subscriber UE 240 and disaster roamers MINT UEs 232, 234 and 236.

For a more granular control of access attempts from MINT UE 232, 234 and 236, enhancements to access categories are needed. Solution #38 (new barringFactor for access category #3) and #40 (offset to barringFactor applicable for access category #3) proposed changes to the uac-BarringFactor per access category by 3GPP TSG CT WG1 (CT1).

In Solution #38, an NG-RAN node can include barring factor for access identity 3 (AI3). It dedicated configuration In Solution #40, a new offset value is introduced to the unified access control barring information. A MINT UE shall apply a uac-DisasterOffsetToBarringFactor to the uac-BarringFactor.

The uac-DisasterOffsetToBarringFactor indicates to the disaster roaming MINT UEs 232, 234 and 236 the offset value by which the BarringFactor must be reduced when evaluating the access barring condition for that access category.

The uac-DisasterOffsetToBarringFactor is defined as a range of s5 till s95 in steps of 5.

An implementation for Solution #40 is shown below:

```
UAC-BarringInfoSetListExt ::=               SEQUENCE (SIZE(1..maxBarringInfoSet)) OF UAC-
BarringInfoSetExt UAC-BarringInfoSetExt ::=     SEQUENCE {
uac-DisasterOffsetToBarringFactor           ENUMERATED {p05,p10, p15, p20, p25, p30, p40,
p50, p60, p70, p75, p80, p85, p90, p95}
}.
```

A disaster roaming MINT UE computes the uac-BarringFactor for its access category as: uac-BarringFactor= max (p00, (uac-BarringFactor—uac-DisasterOffsetToBarringFactor)).

The usage of new AI3 allows network to differentiate inbound roamers MINT UEs 232, 234 and 236 from own subscriber UE 240. But it does not specify for special UEs with access identity 1 (UE is configured for Multimedia Priority Service, MPS), access identity 2 (UE is configured for Mission Critical Service, MCS) and access identity 12-14 (operator configured), whether the new access barring parameters introduced for MINT UE apply or not. If the new access barring parameters for MINT UE apply to the special UEs with access identity 1, 2 and/or 12-14, those special UEs lose their privilege when accessing network 222.

FIG. 3 illustrates a flowchart for a method 300 by a UE in accordance with some embodiments. As shown in FIG. 3, method 300 by a UE includes step 310 and step 320.

In step 310, a UE receives, from a base station (BS), one or more messages providing different barring configurations for different access identities in an access identity set, wherein the UE has at least one access identity, and wherein at least one access identity is from the access identity set and indicates that the UE is a disaster inbound roamer with respect to the BS. In some examples, the one or more messages comprise System Information Block Type1 (SIB1) or a new dedicated SIB. Note that in the following disclosure, only SIB1 is mentioned as an implementation for the one or more messages for the sake of brevity. Those skilled persons in the art should realize that other SIBs (e.g., a new dedicated SIB) may also be used as an implementation for the one or more messages. In some examples, the new dedicated SIB may be a new SIB which is not yet defined in the current specification of wireless mobile communication technology standards and protocols. A UE with any access identity in the access identity set indicates itself as a disaster inbound roamer with respect to the BS. For example, MINT UEs 232, 234 and 236 identify themselves as the disaster inbound roamers with respect to BS 222 as depicted in FIG. 2.

In some implementations, the one or more messages provide different barring configurations for different access identities in the access identity set for each access category.

In step 320, the UE performs an access barring check based on the one or more messages.

FIG. 4 illustrates a transmit scenario 400 with access barring information between a UE and a BS in accordance with some embodiments. In some examples, BS may broadcast one or more messages 410 to any UE under its coverage. In some examples, UE may receive and decode the SIB1 from BS. UE then performs an access barring check based on different barring configurations provided in the one or more messages for different access identities.

Thus, method 300 provides different barring configurations for different MINT UEs through the broadcasted messages between UE and BS. As a result, an independent barring configuration can be implemented for each MINT UE.

In some embodiments, the access identity set comprises a normal access identity and at least one special access identity. In the related art, access identity is determined by a few parameters in universal integrated circuit card (UICC) as described in 24.501-Table 3.5.2.1, reproduced below:
Access Identities

TABLE 3.5.2.1

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access Identity 1 is used by UEs configured for MPS, in the PLMNs where the configuration is valid. The PLMNs where the configuration is valid are HPLMN, PLMNs equivalent to HPLMN, and visited PLMNs of the home country. Access Identity 1 is also valid when the UE is explicity authorized by the network based on specific configured PLMNs inside and outside the home country.
NOTE 2:
Access Identity 2 is used by UEs configured for MCS, in the PLMNs where the configuration is valid. The PLMNs where the configuration is valid are HPLMN or PLMNs equivalent to HPLMN and visited PLMNs of the home country. Access Identity 2 is also valid when the UE is explicity authorized by the network based on specific configured PLMNs inside and outside the home country.
NOTE 3:
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

In some examples, the normal access identity and special access identity in the access identity set may be determined according to the following Table 1:

TABLE 1

| Access Identity in HPLMN D (disaster) | When roam into PLMN A (non-disaster) |
|---|---|
| 0 | MINT 0 |
| 1 (MPS) | MINT 1 |
| 2 (MCS) | MINT 2 |
| 4-10 | For future use |
| 11 | Not applicable |
| 12-14 | MINT 0 |
| 15 | Not applicable |

Table 1 describes a mapping relationship between the access identity in the home public land mobile network in disaster (HPLMN D) (e.g., the PLMN 210 in FIG. 2) and the access identity when the same UE roams into non-disaster PLMN A (e.g., the PLMN 220 in FIG. 2). In some implementations, a normal access identity in the access identity set is MINT 0. In some implementations, one special access identity in the access identity set is MINT 1 and another special access identity in the access identity set is MINT 2. A UE with MINT 1 means that the UE is configured for Multimedia Priority Service (MPS) and a UE with MINT 2 means that the UE is configured for Mission Critical Service (MCS). Note that for MINT UE with access identity 12-14, Table 1 does not differentiate them as those UEs are mainly used for network maintenance.

In some implementations, UE first identifies itself as MINT UE. In some examples, UE identifies itself as access identity 3 on top of Solution #38 or Solution #40. Access identity 3 indicates the UE is a disaster inbound roamer (MINT UE). As being a MINT UE, UE further identifies itself as a MINT 1 and/or MINT 2 according to its access identity in the HPLMN D.

In some variants, the reserved bits in Table 3.5.2.1 (3-10) may be used to indicate the access identity of UE, according to the following Table 2:

TABLE 2

| Access Identity in HPLMN D | When roam into PLMN A (non-disaster) |
|---|---|
| 3 | MINT 0 |
| 4 | MINT 1 |
| 5 | MINT 2 |

In Table 2, the reserved bit 3 (access identity 3) represents normal access identity MINT 0 when UE roams into PLMN A, the reserved bit 4 (access identity 4) represents special access identity MINT 1 indicating that UE is configured for MPS, and the reserved bit 5 (access identity 5) represents special access identity MINT 2 indicating that UE is configured for MCS.

In some implementations, the at least one access identity is indicated by Non-Access Stratum (NAS) layer of the UE.

Thus, by differentiating normal access identity (MINT 0) and special access identities (MINT 1, MINT 2), the embodiments in the present applicant can provide different barring configurations for each MINT UE. In addition, special UE with access identity 1 or access identity 2 is mapped into MINT 1 or MINT 2, respectively. Accordingly, a different barring configuration can be provided for those special UEs in order to keep their privilege.

In some embodiments, the one or more messages comprises at least one barring information. The at least one barring information provides a normal barring configuration for the normal access identity (MINT 0). The normal barring configuration may comprise a barring parameter. The barring parameter comprises a barring factor and a barring time. In some examples, the barring parameter is the same for all types of MINT UE.

In some variants, the at least one barring information further comprises a bitmap. The bitmap indicates whether the normal barring configuration applies to each of the at least one special access identity.

In some implementations, the bitmap comprises a first bit and a second bit, wherein the first bit indicates whether the normal barring configuration applies to the first special access identity (MINT 1), and wherein the second bit indicates whether the normal barring configuration applies to the second special access identity (MINT 2).

In some implementations, the at least one barring information comprises first barring information and second barring information, wherein the first barring information provides barring configurations for UEs with access identities that are not from the access identity set, and wherein the normal barring configuration comprises a second barring factor and a second barring time from the second barring information.

In some examples, the first barring information may be barring information in the current unified access control (UAC) design. For example, the existing UAC on ASN.1 design is shown as below in relevant parts:

```
UAC-BarringInfoSetList ::=          SEQUENCE (SIZE(1..maxBarringInfoSet)) OF UAC-
BarringInfoSet UAC-BarringInfoSet ::=    SEQUENCE {
uac-BarringFactor                   ENUMERATED {p00, p05, p10, p15, p20, p25, p30, p40,
p50, p60, p70, p75, p80, p85, p90, p95},
uac-BarringTime                     ENUMERATED {s4, s8, s16, s32, s64, s128, s256, s512},
uac-BarringForAccessIdentity           BIT STRING (SIZE(7))
}.
```

The uac-BarringForAccessIdentity indicates whether access attempt is allowed for each access identity. The leftmost bit, bit 0 in the bit string corresponds to Access Identity 1, bit 1 in the bit string corresponds to Access Identity 2, bit 2 in the bit string corresponds to Access Identity 11, bit 3 in the bit string corresponds to Access Identity 12, bit 4 in the bit string corresponds to Access Identity 13, bit 5 in the bit string corresponds to Access Identity 14, and bit 6 in the bit string corresponds to Access Identity 15. A bit with value 0 means that access attempt is allowed for the corresponding access identity.

In some variants, a bitmap for MINT UE may be indicated through the barring information contained in a second barring information, the second barring information is parallel to the existing first barring information. For example, the bitmap may be introduced on top of Solution #38, specifically through a second barring information uac-BarringInfoSet-MINT, as the highlighted part below:

```
uac-BarringInfo-MINT                SEQUENCE {
uac-BarringForCommon-MINT               UAC-BarringPerCatList-MINT
}
UAC-BarringPerCatList-MINT ::=          SEQUENCE (SIZE (1..maxAccessCat-1)) OF
UAC-BarringPerCat-MINT
UAC-BarringPerCat-MINT ::=          SEQUENCE { accessCategory
INTEGER (1..maxAccessCat-1),
uac-barringInfoSetIndex-MINT            UAC-BarringInfoSetIndex-MINT
}
UAC-BarringInfoSetList-MINT ::=         SEQUENCE (SIZE(1..maxBarringInfoSet)) OF
UAC-BarringInfoSet-MINT
UAC-BarringInfoSet-MINT ::=         SEQUENCE {
uac-BarringFactor                   ENUMERATED {p00, p05, p10, p15, p20, p25, p30, p40,
p50, p60, p70, p75, p80, p85, p90, p95},
uac-BarringTime                     ENUMERATED {s4, s8, s16, s32, s64, s128, s256, s512},
uac-BarringForAccessIdentityMINT        BIT STRING (SIZE(2))
}.
```

In some embodiments, the uac-BarringInfo-MINT is considered as the second barring information that is parallel to the existing barring information uac-BarringInfo. In the second barring information, the bitmap uac-BarringForAccessIdentityMINT indicates whether access attempt is allowed for each access identity for MINT UE. In some implementations, the leftmost bit, bit 0 in the bit string corresponds to MINT 1 or access identity 1 in HPLMN, and bit 1 in the bit string corresponds to MINT 2 or access identity 2 in HPLMN. In some examples, a bit with value 0 means that access attempt is allowed for the corresponding access identity, and a bit with value 1 means that the normal barring configuration (i.e., uac-BarringFactor and uac-BarringTime) applies to the corresponding access identity.

In some embodiments, the first barring information is applicable to UEs with access identities that are not from the access identity set, that is, it applies to its own subscribers or non-roaming UE. The second barring information applies to the UEs with access identities that are from the access identity set, i.e., the MINT UE.

In some variants, a bitmap for MINT UE may be indicated as the highlighted part below:

```
UAC-BarringInfoSet-MINT ::=      SEQUENCE { accessCategory
INTEGER (1..maxAccessCat-1),
uac-BarringForAccessIdentityMINT      BIT STRING (SIZE(2))
}.
```

In some variants, a bitmap for MINT UE may be indicated from the first information on top of Solution #40. For example, the at least one barring information comprises first barring information, wherein the first barring information comprises a first barring factor, a first barring time, and an offset information, and wherein the normal barring configuration is a computation result from the first barring factor, the first barring time, and the offset information.

In some examples, the first barring information may be barring information in the current UAC design. For example, the existing UAC design is shown as below in relevant parts:

```
UAC-BarringInfoSetList ::=          SEQUENCE (SIZE(1..maxBarringInfoSet)) OF UAC-
BarringInfoSet UAC-BarringInfoSet ::=      SEQUENCE {
uac-BarringFactor                   ENUMERATED {p00, p05, p10, p15, p20, p25, p30, p40,
p50, p60, p70, p75, p80, p85, p90, p95},
uac-BarringTime                     ENUMERATED {s4, s8, s16, s32, s64, s128, s256, s512},
uac-BarringForAccessIdentity        BIT STRING (SIZE(7))
}.
```

In some examples, the bitmap for MINT UE may be indicated as the highlighted part below:

```
UAC-BarringInfoSetListExt ::=       SEQUENCE (SIZE(1..maxBarringInfoSet)) OF UAC-
BarringInfoSetExt UAC-BarringInfoSetExt ::=      SEQUENCE {
uac-DisasterOffsetToBarringFactor   ENUMERATED {p05,p10, p15, p20, p25, p30, p40,
p50, p60, p70, p75, p80, p85, p90, p95}
uac-BarringForAccessIdentityMINT       BIT STRING (SIZE(2))
}.
```

In some embodiments, the uac-BarringInfo is considered as the first barring information. In the first barring information, the bitmap uac-BarringForAccessIdentityMINT indicates whether access attempt is allowed for each access identity for MINT UE. Note that the uac-BarringFactor of normal MINT UE shall apply a uac-DisasterOffsetToBarringFactor in the following way:

$$uac\text{-}BarringFactor=\max(p00,(uac\text{-}BarringFactor-uac\text{-}DisasterOffsetToBarringFactor))$$

In some implementations, the leftmost bit, bit 0 in the bit string corresponds to MINT 1 or access identity 1 in HPLMN, and bit 1 in the bit string corresponds to MINT 2 or access identity 2 in HPLMN. In some examples, a bit with value 0 means that access attempt is allowed for the corresponding access identity, and a bit with value 1 means that the normal barring configuration (i.e., uac-BarringFactor and uac-BarringTime, after the offset has been applied) applies to the corresponding access identity.

In some embodiments, after receiving the one or more messages comprising the bitmap as discussed above, MINT UE may perform the access barring check. FIG. 5 illustrates a flowchart for a method 500 of performing access barring check as illustrated in FIG. 3 in accordance with some embodiments. As shown in FIG. 5, performing access barring check (step 320) comprises step 510 to step 550.

In step 510, determining, whether the at least one access identity of the UE comprises one of the at least one special access identity.

In step 520, performing, in response to a determination that the at least one access identity does not comprise the one of the at least one special access identity, performing the access barring check based on the normal barring configuration.

In step 530, in response to a determination that the at least one access identity comprises the one of the at least one special access identity: determining, based on the bitmap, whether the normal barring configuration applies to the one of at least one special access identity.

In step 540, performing, in response to a determination that the normal barring configuration applies to the one of at least one special access identity, the access barring check based on the normal barring configuration.

In step 550, determining, in response to a determination that the normal barring configuration does not apply to the one of at least one special access identity, that a result of the access barring check is not barred.

In some implementations, UE first identifies itself as normal UE in HPLMN or MINT UE when roaming into the current network. In some examples, for normal access identity like MINT 0, the normal configuration applies. For one access category, UE with MINT 0 will generate a random number. If the random number is smaller than the barring factor contained in the normal barring configuration, the access attempt is considered as allowed. Otherwise, the access attempt is considered as barred.

In some examples, for MINT UE with at least one special access identity (e.g., MINT 1 or MINT 2), similar access is the existing uac-BarringInfo, and provides corresponding barring factor and barring time for each MINT UE for each access category. For example, the corresponding barring factor and barring time may be indicated as the highlighted below:

```
UAC-BarringInfoSet-MINT-AI0 ::=      SEQUENCE {
uac-BarringFactor                    ENUMERATED {p00, p05, p10, p15, p20, p25, p30, p40,
p50, p60, p70, p75, p80, p85, p90, p95},
uac-Barring Time                     ENUMERATED {s4, s8, s16, s32, s64, s128, s256, s512},
}
UAC-BarringInfoSet-MINT-AI1 ::=      SEQUENCE {
uac-BarringFactor                    ENUMERATED {p00, p05, p10, p15, p20, p25, p30, p40,
p50, p60, p70, p75, p80, p85, p90, p95}
uac-BarringTime                      ENUMERATED {s4, s8, s16, s32, s64, s128, s256, s512},
}
UAC-BarringInfoSet-MINT-AI2 ::=      SEQUENCE {
uac-BarringFactor                    ENUMERATED {p00, p05, p10, p15, p20, p25, p30, p40,
p50, p60, p70, p75, p80, p85, p90, p95},
uac-BarringTime                      ENUMERATED {s4, s8, s16, s32, s64, s128, s256, s512},
}.
``` barring check may be performed like MINT 0. If, for one access category, the access attempt is considered as barred, UE further checks the bitmap (e.g., eac-BarringForAccessIdentity MINT) to see if at least for one of these access identities indicated by NAS layer, the corresponding bit in the bitmap is set to 0. If the corresponding bit is set to 0, MINT UE considers itself not barred.

In some examples, for MINT UE with at least one special access identity (e.g., MINT 1 or MINT 2), MINT UE may first check the bitmap (e.g., eac-BarringForAccessIdentity MINT) to see if at least for one of these access identities indicated by NAS layer, the corresponding bit in the bitmap is set to 0. If the corresponding bit is set to 0, MINT UE considers itself not barred. Otherwise, MINT UE performs access barring check according to normal barring configuration.

Thus, according to some embodiments, UE with special access identity (e.g., MINT 1 or MINT 2) is configured with a bitmap when performing access barring check. By introducing the bitmap, UE with special access identity can have relaxed barring configuration. For example, when UE with MINT 1 performs barring check for an access category and the corresponding bit in the bitmap is set to 0, the UE with MINT 1 will consider itself not barred. Accordingly, the privilege of UE with special access identity will be kept when it roams to the new network.

In some implementations, for each MINT UE, a separate barring configuration may be introduced. In some examples, the one or more messages comprise at least one barring information, wherein for each access identity from the access identity set the at least one barring information provides a corresponding barring configuration, wherein the corresponding configuration comprises a corresponding barring factor and a corresponding barring time.

In some implementations, the at least one barring information comprises first barring information and second barring information, wherein the first barring information provides barring configurations for UEs with access identities that are not from the access identity set, and wherein for each access identity, the corresponding barring factor and the corresponding barring time are from the second barring information. In some examples, the first barring information In some implementations, UE first identifies itself as MINT UE when roaming into current network. If UE is MINT UE, UE selects UAC-BarringInfoSet-MINT-AIx (x=0, 1 or 2), according to its access identity in HPLMN, based on the access category. For example, UE with access identity 1 in HPLMN will have the special access identity MINT 1 in the current network and will select UAC-BarringInfoSet-MINT-AI1 to perform access barring check. In another example, UE with access identity 0, or 12-14, will have the normal access identity MINT 0 in the current network and will select UAC-BarringInfoSet-MINT-AI0 to perform access barring check.

In some variants, if UE is configured with multiple access identities among access identity 1 and 2 in HPLMN, UE will have UAC-BarringInfoSet-MINT-AI1 and UAC-BarringInfoSet-MINT-AI2. UE can select the most optimal value. The most optimal value may be the one configuration that has the highest possibility to allow the MINT UE to connect. For example, the configuration with the largest barring factor. It also may be the configuration with the smallest barring time.

Thus, by separately configuring each MINT UE, the flexibility has been greatly increased and special MINT UE (MINT 1, MINT 2) can preserve their privilege by designing corresponding barring factor and barring time.

In addition to configuring the barring factor and barring time for each MINT UE, the at least one barring information may configure the offset for each MINT UE on top of Solution #40. In some variants, the at least one barring information comprises first barring information, the first barring information comprising a first barring factor and a first barring time, and wherein for each access identity, the first barring information further comprises at least one corresponding offset information selected from a group consisting of: a corresponding offset to the first barring factor; and a corresponding offset to the first barring time. In some examples, the first barring information provides the same first barring factor and first barring time for all UEs. Each MINT UE is furthered configured with at least one corresponding offset information applied to the first barring factor and/or the first barring time. For example, the at least one corresponding offset information may be indicated as the highlighted part below:

```
UAC-BarringInfoSetListExt ::=              SEQUENCE (SIZE(1..maxBarringInfoSet)) OF UAC-
BarringInfoSetExt UAC-BarringInfoSetExt ::=   SEQUENCE {
uac-DisasterOffsetToBarringFactor-AI0      ENUMERATED {p05,p10, p15, p20, p25,
p30, p40,
p50, p60, p70, p75, p80, p85, p90, p95}
uac-DisasterOffsetToBarring Time-AI0       ENUMERATED {s4, s8, s16, s32, s64, s128,
s256, s512}
uac-DisasterOffsetToBarringFactor-AI1      ENUMERATED {p05,p10, p15, p20, p25,
p30, p40,
p50, p60, p70, p75, p80, p85, p90, p95}
uac-DisasterOffsetToBarringTime-AI1         ENUMERATED {s4, s8, s16, s32, s64, s128,
s256, s512}
uac-DisasterOffsetToBarringFactor-AI2       ENUMERATED {p05,p10, p15, p20, p25,
p30, p40,
p50, p60, p70, p75, p80, p85, p90, p95}
uac-DisasterOffsetToBarringTime-AI2         ENUMERATED {s4, s8, s16, s32, s64, s128,
s256, s512}
}.
```

The above implementation for the at least one corresponding offset information show both the offset to the barring factor and the offset to the barring time. It should be noted that the at least one corresponding offset information may comprise only the offset to the barring factor or only the offset to the barring time.

In some implementations, UE first identifies the access category and finds the corresponding entry (UAC-BarringInfoSet indicating the BarringFactor and Barring Time for the access category) in UAC-BarringInfoSetList. If UE is MINT UE, UE selects uac-DisasterOffsetToBarringFactor-AIx and/or uac-DisasterOffsetToBarringTime-AIx (x=0, 1 or 2), according to its access identity in HPLMN to check if the initial service (access category) has associated access barring parameter configured or not. For example, UE with access identity 1 in HPLMN will have the special access identity MINT 1 in the current network and will select uac-DisasterOffsetToBarringFactor-AI1 and/or uac-DisasterOffsetToBarringTime-AI1 applied to the first barring factor and the first barring time. In another example, UE with access identity 0, 12, 13, or 14, will have the normal access identity MINT 0 in the current network and will select uac-DisasterOffsetToBarringFactor-AI0 and/or uac-DisasterOffsetToBarringTime-AI0 applied to the first barring factor and the first barring time.

In some variants, if UE is configured with multiple access identities among access identity 1 and 2 in HPLMN, UE will have uac-DisasterOffsetToBarringFactor-AI1 and/or uac-DisasterOffsetToBarringTime-AI1, and uac-DisasterOffsetToBarringFactor-AI2 and/or uac-DisasterOffsetToBarringTime-AI2. UE can select the most optimal value. The most optimal value may be the one configuration that has the highest possibility to allow the MINT UE to connect (e.g., the configuration with the largest barring factor). It also may be the configuration with the smallest barring time.

In some implementations, for each access identity: wherein the corresponding barring factor is a computation result from the first barring factor and the corresponding offset to the first barring factor, and/or wherein, the corresponding barring time is a computation result from the first barring time and the corresponding offset to the first barring time. For example, the corresponding barring factor can be calculated as: uac-BarringFactor for Disaster Inbound Roamer UE=max (p00, (uac-BarringFactor—uac-DisasterOffsetToBarringFactor-AIx)).

Thus, by independently configuring the offset information for each MINT UE, the special MINT UE (MINT 1, MINT 2) can preserve their privilege by adjusting the corresponding offset information.

In some embodiments, MINT UE may use the reserved bits in the current access identity table according to the Table 2 as illustrated above. In some variants, the corresponding in the one or more messages (e.g., SIB1) should also be adjusted, with access identity 3, 4, 5 to identity the three types of MINT UE. In some examples, for each access identity, the at least one barring information comprises corresponding barring information, wherein the corresponding barring information provides the corresponding barring configuration.

Figure 6:
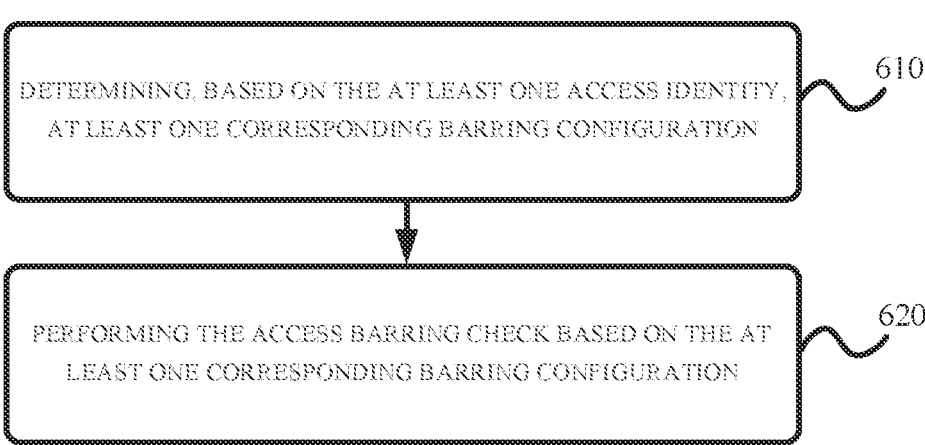
FIG. 6 illustrates a flowchart for another method of performing access barring check as illustrated in FIG. 3 in accordance with some embodiments.

In some embodiments, after receiving the one or more messages comprising corresponding barring configuration for each MINT UE as discussed above, MINT UE may perform the access barring check. FIG. 6 illustrates a flowchart for another method 600 of performing access barring check as illustrated in FIG. 3 in accordance with some embodiments. As shown in FIG. 6, performing access barring (step 320) comprise step 610 and 620.

In step 610, determining, based on the at least one access identity, at least one corresponding barring configuration.

In step 620, performing the access barring check based on the at least one corresponding barring configuration.

In some examples, MINT UE with multiple access identities may have multiple corresponding barring configurations. MINT UE will perform the access barring check based on the most optimal value among the multiple corresponding barring configurations. The most optimal value may be the one configuration that has the highest possibility to allow the MINT UE to connect (e.g., the configuration with the largest barring factor). It also may be the configuration with the smallest barring time.

Thus, since each MINT UE has been separately configured based on the one or more messages broadcasted from BS, UE with special access identity can have relaxed barring configuration and the privilege is preserved.

Figure 7:
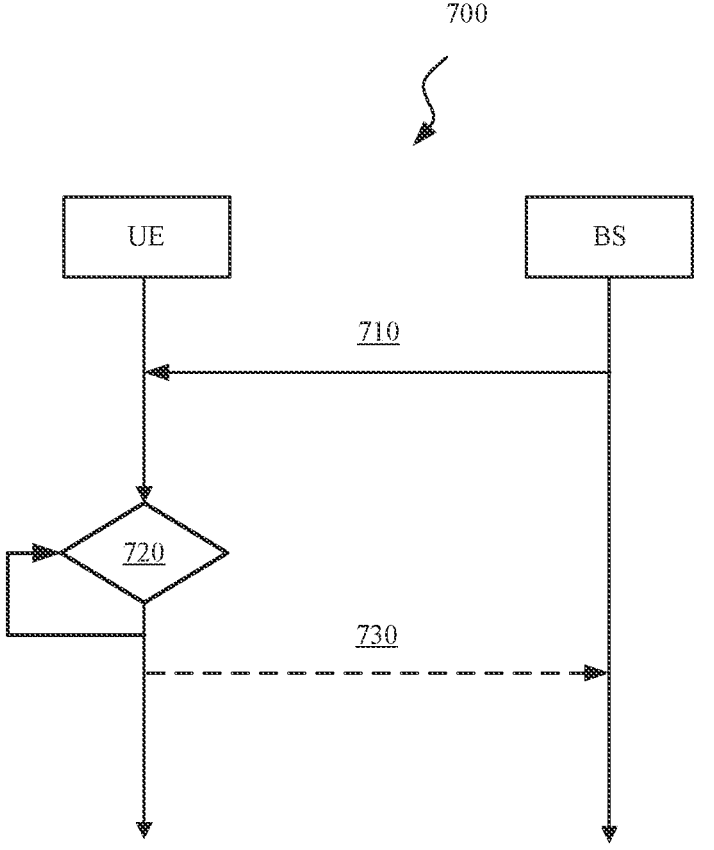
FIG. 7 illustrates an access control procedure based access barring information in accordance with some embodiments.

FIG. 7 illustrates an access control procedure 700 based on access barring information in accordance with some embodiments. As shown in FIG. 7, UE receives and decodes one or more messages 710 (e.g., SIB1) from BS. In 720, UE performs access barring check based on SIB1 and its access identity. If a result of the access barring check is not barred, UE will send a connection request 730 to BS. If a result of the access barring check is barred, UE will first wait a period of time in accordance with the barring time in the barring configuration, and then perform the access barring check 720 again.

FIG. 8 illustrates a flowchart for a method 800 by a BS in accordance with some embodiments. As shown in FIG. 8, method 800 comprises steps 810 and 820.

In step 810, determining one or more messages providing different barring configurations for different access identities in an access identity set, wherein the UE has at least one access identity, and wherein the at least one access identity is from the access identity set and indicates that the UE is a disaster inbound roamer with respect to the BS; and in step 820, sending the one or more messages to the UE.

FIG. 9 illustrates a block diagram of an apparatus for a UE in accordance with some embodiments. The apparatus 900 illustrated in FIG. 9 may comprise one or more processors configured to perform steps of the method 300 as illustrated in combination with FIG. 3. As shown in FIG. 9, the apparatus 900 includes receiving unit 910 and performing unit 920.

The receiving unit 910 is configured to receive, from a base station (BS), one or more messages providing different barring configurations for different access identities in an access identity set, wherein the UE has at least one access identity, and wherein the at least one access identity is from the access identity set and indicates that the UE is a disaster inbound roamer with respect to the BS.

The performing unit 920 is configured to perform, by the UE, an access barring check based on the one or more messages.

FIG. 10 illustrates a block diagram of an apparatus for a BS in accordance with some embodiments. The apparatus 1000 illustrated in FIG. 10 may comprise one or more processors configured to perform steps of the method 800 as illustrated in combination with FIG. 8. As shown in FIG. 10, the apparatus 1000 includes determining unit 1010 and sending unit 1020.

The determining unit 1010 is configured to determine one or more messages providing different barring configurations for different access identities in an access identity set, wherein the UE has at least one access identity, and wherein the at least one access identity is from the access identity set and indicates that the UE is a disaster inbound roamer with respect to the BS.

The sending unit 1020 is configured to sending the one or more messages to the UE.

Figure 11:
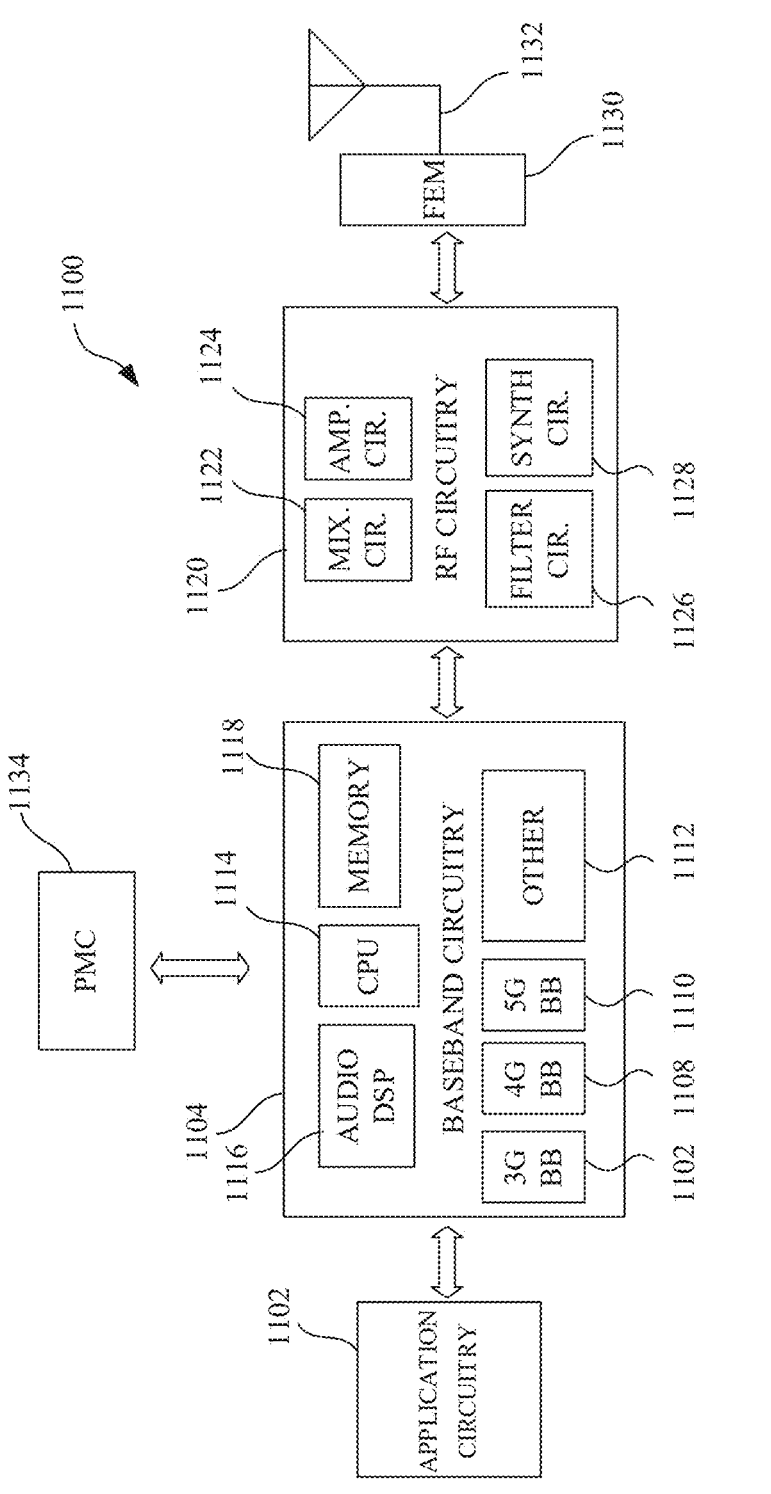
FIG. 11 illustrates a communication device (e.g., a UE or a base station) in accordance with some embodiments.

FIG. 11 illustrates example components of a device 1100 in accordance with some embodiments. In some embodiments, the device 1100 may include application circuitry 1102, baseband circuitry 1104, Radio Frequency (RF) circuitry (shown as RF circuitry 1120), front-end module (FEM) circuitry (shown as FEM circuitry 1130), one or more antennas 1132, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1102, and instead include a processor/controller to process IP data received from an EPC). In some embodiments, the device 1100 may include additional elements such as, for example, memory/ storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/ storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1120 and to generate baseband signals for a transmit signal path of the RF circuitry 1120. The baseband circuitry 1104 may interface with the application circuitry 1102 for generation and processing of the baseband signals and for controlling operations of the RF circuitry 1120. For example, in some embodiments, the baseband circuitry 1104 may include a third generation (3G) baseband processor (3G baseband processor 1106), a fourth generation (4G) baseband processor (4G baseband processor 1108), a fifth generation (5G) baseband processor (5G baseband processor 1110), or other baseband processor(s) 1112 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1120. In other embodiments, some or all of the functionality of the illustrated baseband processors may be included in modules stored in the memory 1118 and executed via a Central Processing ETnit (CPET 1114). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail- biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1116. The one or more audio DSP(s) 1116 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU- TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1120 may enable communication with wireless networks using modulated electromagnetic radiation through a non-solid medium. In various embodiments, the RF circuitry 1120 may include switches, filters, amplifiers, etc. to facilitate the communication with the wireless network. The RF circuitry 1120 may include a receive signal path which may include circuitry to down-convert RF signals received from the FEM circuitry 1130 and provide baseband signals to the baseband circuitry 1104. The RF circuitry 1120 may also include a transmit signal path which may include circuitry to up-convert baseband signals provided by the baseband circuitry 1104 and provide RF output signals to the FEM circuitry 1130 for transmission.

In some embodiments, the receive signal path of the RF circuitry 1120 may include mixer circuitry 1122, amplifier circuitry 1124 and filter circuitry 1126. In some embodiments, the transmit signal path of the RF circuitry 1120 may include filter circuitry 1126 and mixer circuitry 1122. The RF circuitry 1120 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1130 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1130. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature down conversion and up conversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct down conversion and direct up conversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1120 may include analog-to-digital converter (ADC) and digital-to-analog converter (DAC) circuitry and the baseband circuitry 1104 may include a digital baseband interface to communicate with the RF circuitry 1120.

In some dual-mode embodiments, a separate radio IC circuitry may be provided for processing signals for each spectrum, although the scope of the embodiments is not limited in this respect.

In some embodiments, the synthesizer circuitry 1128 may be a fractional-N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1120 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 (such as an applications processor) depending on the desired output frequency. In some embodiments, a divider control input (e.g., N) may be determined from a look-up table based on a channel indicated by the application circuitry 1102.

Synthesizer circuitry 1128 of the RF circuitry 1120 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1120 may include an IQ/polar converter.

The FEM circuitry 1130 may include a receive signal path which may include circuitry configured to operate on RF signals received from one or more antennas 1132, amplify the received signals and provide the amplified versions of the received signals to the RF circuitry 1120 for further processing. The FEM circuitry 1130 may also include a transmit signal path which may include circuitry configured to amplify signals for transmission provided by the RF circuitry 1120 for transmission by one or more of the antennas 1132. In various embodiments, the amplification through the transmit or receive signal paths may be done solely in the RF circuitry 1120, solely in the FEM circuitry 1130, or in both the RF circuitry 1120 and the FEM circuitry 1130.

In some embodiments, the FEM circuitry 1130 may include a TX/RX switch to switch between transmit mode and receive mode operation. The FEM circuitry 1130 may include a receive signal path and a transmit signal path. The receive signal path of the FEM circuitry 1130 may include an LNA to amplify received RF signals and provide the amplified received RF signals as an output (e.g., to the RF circuitry 1120). The transmit signal path of the FEM circuitry 1130 may include a power amplifier (PA) to amplify input RF signals (e.g., provided by the RF circuitry 1120), and one or more filters to generate RF signals for subsequent transmission (e.g., by one or more of the one or more antennas 1132).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in an EGE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1102, the RF circuitry 1120, or the FEM circuitry 1130.

In some embodiments, the PMC 1134 may control, or otherwise be part of, various power saving mechanisms of the device 1100. For example, if the device 1100 is in an RRC Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality while processors of the application circuitry 1102 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
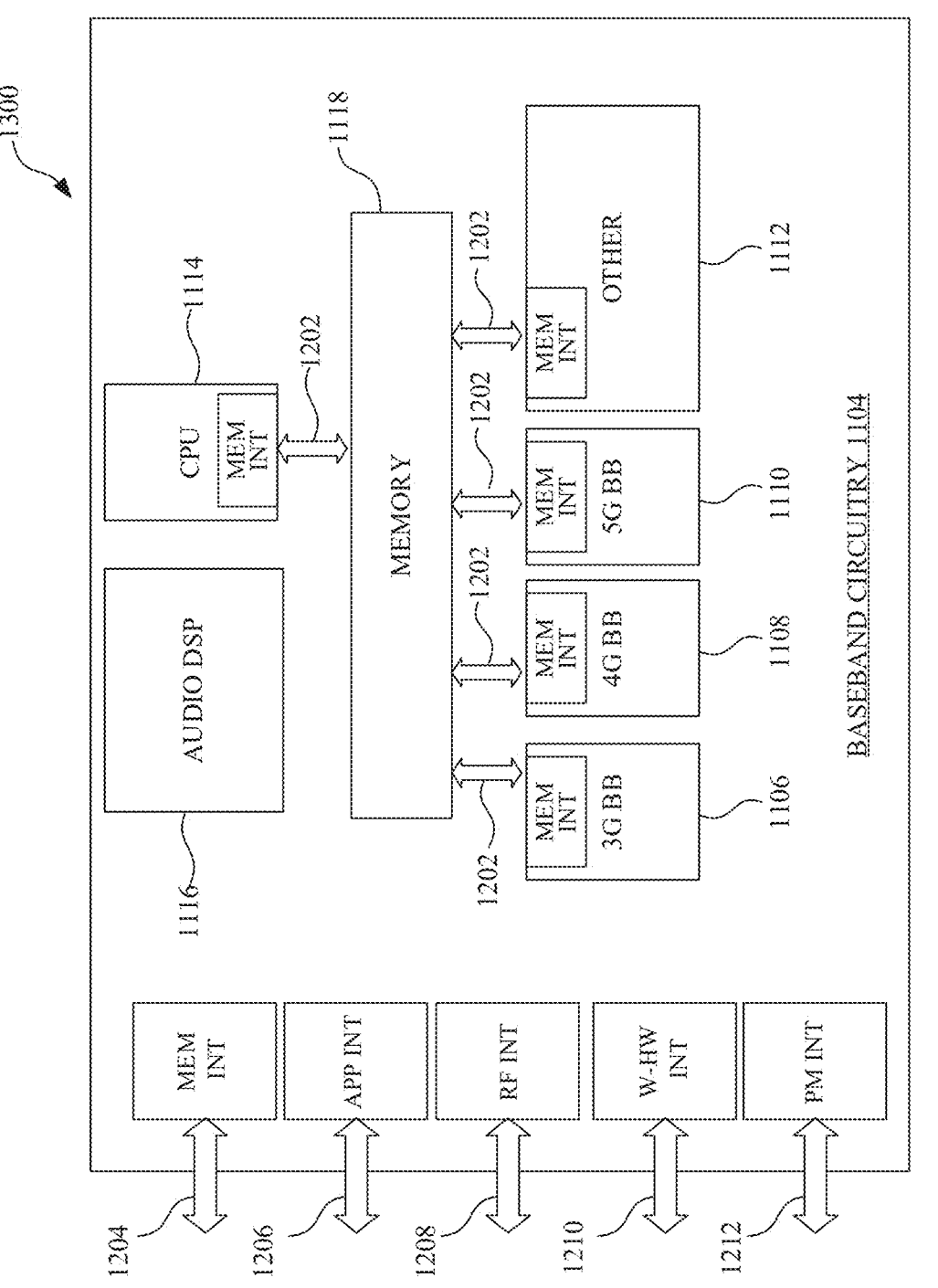
FIG. 12 illustrates example interfaces of baseband circuitry in accordance with some embodiments.

FIG. 12 illustrates example interfaces 1200 of baseband circuitry in accordance with some embodiments. As discussed above, the baseband circuitry 1104 of FIG. 11 may comprise 3G baseband processor 1106, 4G baseband processor 1208, 5G baseband processor 1110, other baseband processor(s) 1112, CPU 1114, and a memory 1218 utilized by said processors. As illustrated, each of the processors may include a respective memory interface 1202 to send/receive data to/from the memory 1218.

The baseband circuitry 1104 may further include one or more interfaces to communicatively couple to other circuitries/devices, such as a memory interface 1204 (e.g., an interface to send/receive data to/from memory external to the baseband circuitry 1204), an application circuitry interface 1206 (e.g., an interface to send/receive data to/from the application circuitry 1102 of FIG. 11), an RF circuitry interface 1208 (e.g., an interface to send/receive data to/from RF circuitry 1120 of FIG. 11), a wireless hardware connectivity interface 1210 (e.g., an interface to send/receive data to/from Near Field Communication (NFC) components, Bluetooth® components (e.g., Bluetooth® Low Energy), Wi-Fi® components, and other communication components), and a power management interface 1212 (e.g., an interface to send/receive power or control signals to/from the PMC 1124).

Figure 13:
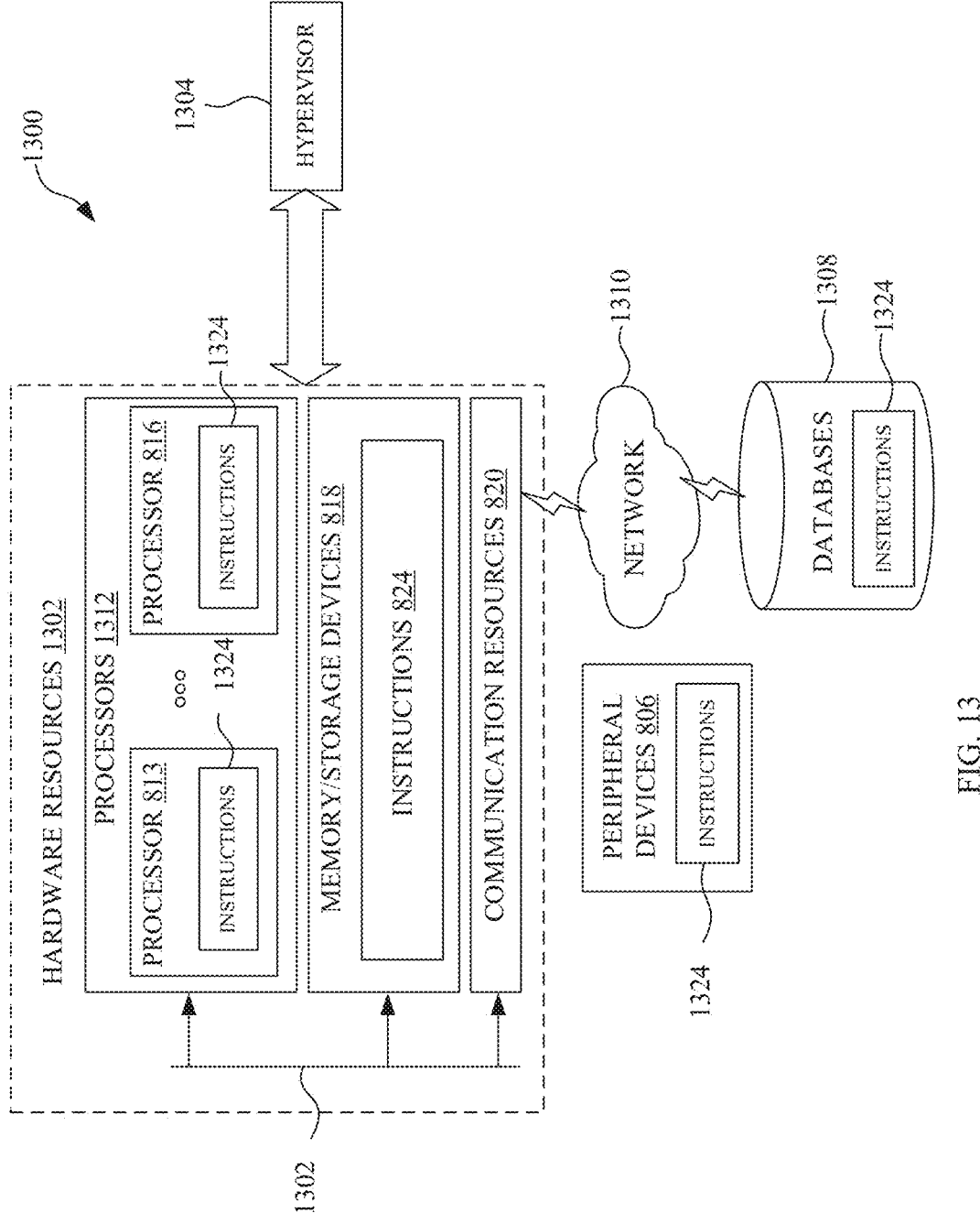
FIG. 13 illustrates components in accordance with some embodiments.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302.

The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable program-mable read-only memory (EEPROM), Flash memory, solid-state storage, etc.

The communication resources 1320 may include inter-connection or network interface components or other suit-able devices to communicate with one or more peripheral devices 1306 or one or more databases 1308 via a network 1310. For example, the communication resources 1320 may include wired communication components (e.g., for cou-pling via a Universal Serial Bus (USB)), cellular commu-nication components, NFC components, Bluetooth® com-ponents (e.g., Bluetooth® Low Energy), Wi-Fi® components, and other communication components.

Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the proces-sor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

For one or more embodiments, at least one of the com-ponents set forth in one or more of the preceding figures may be configured to perform one or more operations, tech-niques, processes, and/or methods as set forth in the example section below. For example, the baseband circuitry as described above in connection with one or more of the preceding figures may be configured to operate in accor-dance with one or more of the examples set forth below. For another example, circuitry associated with a UE, base sta-tion, network element, etc., as described above in connection with one or more of the preceding figures may be configured to operate in accordance with one or more of the examples set forth below in the example section.

Figure 14:
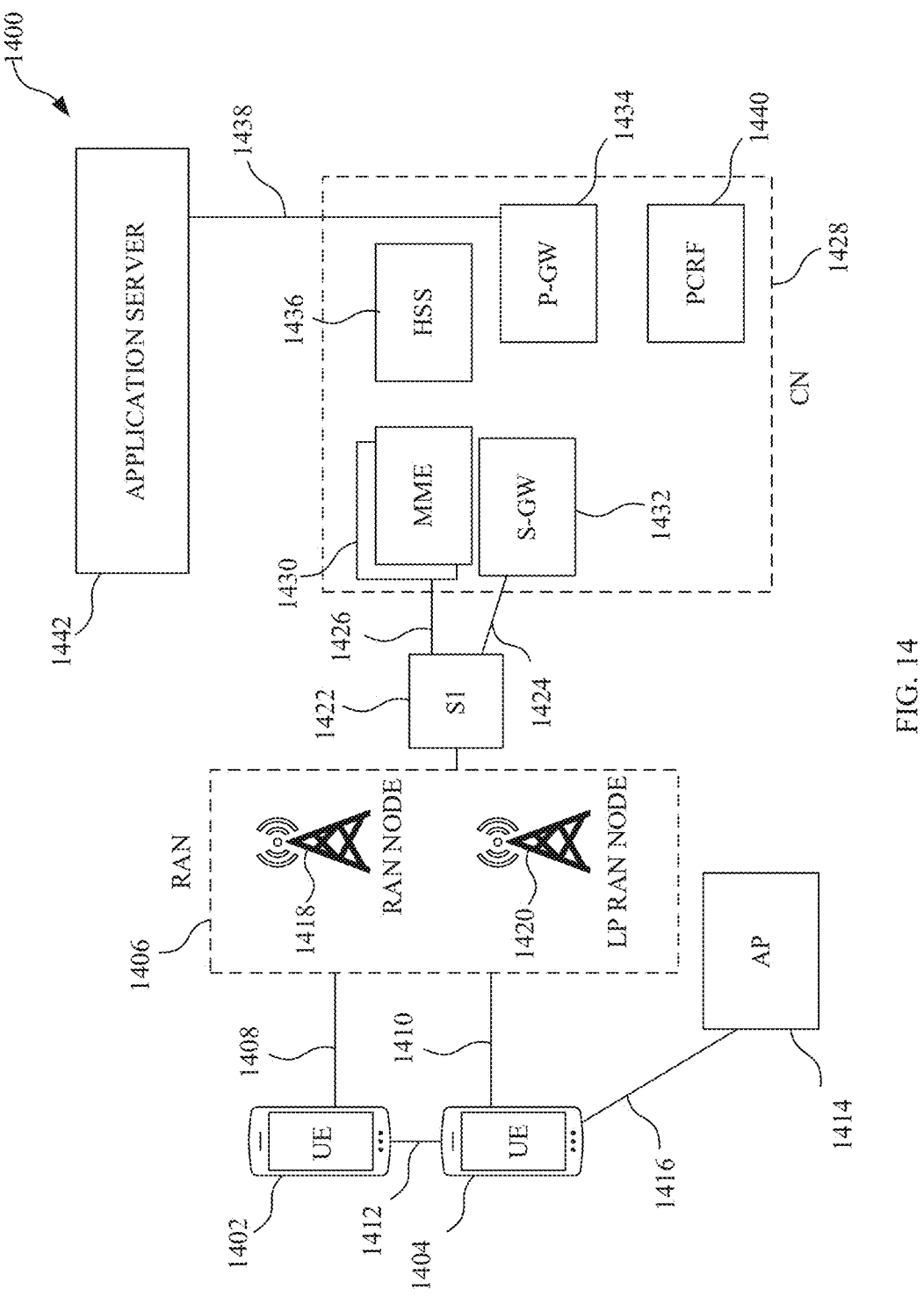
FIG. 14 illustrates an architecture of a wireless network in accordance with some embodiments.

FIG. 14 illustrates an architecture of a system 1400 of a network in accordance with some embodiments. The system 1400 includes one or more user equipment (UE), shown in this example as a UE 1402 and a UE 1404. The UE 1402 and the UE 1404 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1402 and the UE 1404 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connec-tions. The IoT UEs may execute background applications (e.g., keep-alive messages, status updates, etc.) to facilitate the connections of the IoT network.

The UE 1402 and the UE 1404 may be configured to connect, e.g., communicatively couple, with a radio access network (RAN), shown as RAN 1406. The RAN 1406 may be, for example, an Evolved ETniversal Mobile Telecom-munications System (ETMTS) Terrestrial Radio Access Network (E-UTRAN), a NextGen RAN (NG RAN), or some other type of RAN. The UE 1402 and the UE 1404 utilize connection 1408 and connection 1410, respectively, each of which comprises a physical communications interface or layer (discussed in further detail below); in this example, the connection 1408 and the connection 1410 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1402 and the UE 1404 may further directly exchange communication data via a ProSe interface 1412. The ProSe interface 1412 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Chan-nel (PSBCH).

The UE 1404 is shown to be configured to access an access point (AP), shown as AP1 144, via connection 1416. The connection 1416 can comprise a local wireless connec-tion, such as a connection consistent with any IEEE 802.14 protocol, wherein the AP 1414 would comprise a wireless fidelity (WiFiR) router. In this example, the AP 1414 may be connected to the Internet without connecting to the core network of the wireless system (described in further detail below).

The RAN 1406 can include one or more access nodes that enable the connection 1408 and the connection 1410. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1406 may include one or more RAN nodes for providing macrocells, e.g., macro RAN node 1418, and one or more RAN nodes for providing femtocells or picocells (e.g., cells having smaller coverage areas, smaller user capacity, or higher bandwidth compared to macrocells), e.g., a low power (LP) RAN node such as LP RAN node 1420.

Any of the macro RAN node 1418 and the LP RAN node 1420 can terminate the air interface protocol and can be the first point of contact for the UE 1402 and the UE 1404. In some embodiments, any of the macro RAN node 1418 and the LP RAN node 1420 can fulfill various logical functions for the RAN 1406 including, but not limited to, radio network controller (RNC) functions such as radio bearer management, uplink and downlink dynamic radio resource management and data packet scheduling, and mobility man-agement.

In accordance with some embodiments, the UE 1402 and the UE 1404 can be configured to communicate using Orthogonal Frequency-Division Multiplexing (OFDM) communication signals with each other or with any of the macro RAN node 1418 and the LP RAN node 1420 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1418 and the LP RAN node 1420 to the UE 1402 and the UE 1404, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1402 and the UE 1404. The physical downlink control channel (PDCCH) may carry information about the transport format and resource allocations related to the PDSCH channel, among other things. It may also inform the UE 1402 and the UE 1404 about the transport format, resource allocation, and H-ARQ (Hybrid Automatic Repeat Request) information related to the uplink shared channel. Typically, downlink scheduling (assigning control and shared channel resource blocks to the UE 1404 within a cell) may be performed at any of the macro RAN node 1418 and the LP RAN node 1420 based on channel quality information fed back from any of the UE 1402 and UE 1404. The downlink resource assignment information may be sent on the PDCCH used for (e.g., assigned to) each of the UE 1402 and the UE 1404.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1406 is communicatively coupled to a core network (CN), shown as CN 1428 via an SI interface 1422. In embodiments, the CN 1428 may be an evolved packet core (EPC) network, a NextGen Packet Core (NPC) network, or some other type of CN. In this embodiment the SI interface 1422 is split into two parts: the SI-U interface 1424, which carries traffic data between the macro RAN node 1418 and the LP RAN node 1420 and a serving gateway (S-GW), shown as S-GW 1132, and an SI-mobility management entity (MME) interface, shown as SI-MME interface 1426, which is a signaling interface between the macro RAN node 1418 and LP RAN node 1420 and the MME(s) 1430.

In this embodiment, the CN 1428 comprises the MME(s) 1430, the S-GW 1432, a Packet Data Network (PDN) Gateway (P-GW) (shown as P-GW 1434), and a home subscriber server (HSS) (shown as HSS 1436). The MME(s) 1430 may be similar in function to the control plane of legacy Serving General Packet Radio Service (GPRS) Support Nodes (SGSN). The MME(s) 1430 may manage mobility aspects in access such as gateway selection and tracking area list management. The HSS 1436 may comprise a database for network users, including subscription-related information to support the network entities' handling of communication sessions. The CN 1428 may comprise one or several HSS 1436, depending on the number of mobile subscribers, on the capacity of the equipment, on the organization of the network, etc. For example, the HSS 1436 can provide support for routing/roaming, authentication, authorization, naming/addressing resolution, location dependencies, etc.

The S-GW 1432 may terminate the SI interface 322 towards the RAN 1406, and routes data packets between the RAN 1406 and the CN 1428. In addition, the S-GW 1432 may be a local mobility anchor point for inter-RAN node handovers and also may provide an anchor for inter-3 GPP mobility. Other responsibilities may include lawful intercept, charging, and some policy enforcement.

The P-GW 1434 may terminate an SGi interface toward a PDN. The P-GW 1434 may route data packets between the CN 1428 (e.g., an EPC network) and external networks such as a network including the application server 1442 (alternatively referred to as application function (AF)) via an Internet Protocol (IP) interface (shown as IP communications interface 1438). Generally, an application server 1442 may be an element offering applications that use IP bearer resources with the core network (e.g., ETMTS Packet Services (PS) domain, LTE PS data services, etc.). In this embodiment, the P-GW 1434 is shown to be communicatively coupled to an application server 1442 via an IP communications interface 1438. The application server 1442 can also be configured to support one or more communication services (e.g., Voice-over-Internet Protocol (VOIP) sessions, PTT sessions, group communication sessions, social networking services, etc.) for the UE 1402 and the UE 1404 via the CN 1428.

The P-GW 1434 may further be a node for policy enforcement and charging data collection. A Policy and Charging Enforcement Function (PCRF) (shown as PCRF 1440) is the policy and charging control element of the CN 1428. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1440 may be communicatively coupled to the application server 1442 via the P-GW 1434. The application server 1442 may signal the PCRF 1440 to indicate a new service flow and select the appropriate Quality of Service (QOS) and charging parameters. The PCRF 1440 may provision this rule into a Policy and Charging Enforcement Function (PCEF) (not shown) with the appropriate traffic flow template (TFT) and QoS class of identifier (QCI), which commences the QoS and charging as specified by the application server 1442.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method by a user equipment (UE), comprising: receiving, from a base station (BS), one or more messages providing different barring configurations for different access identities in an access identity set, wherein the UE has at least one access identity, and wherein the at least one access identity is from the access identity set and indicates that the UE is a disaster inbound roamer with respect to the BS: and performing, by the UE, an access barring check based on the one or more messages.

Example 2 is the method of Example 1, wherein the access identity set comprises a normal access identity and at least one special access identity.

Example 3 is the method of Example 2, wherein the one or more messages comprise at least one barring information, wherein the at least one barring information provides a normal barring configuration for the normal access identity.

Example 4 is the method of Example 3, wherein the at least one barring information further comprises a bitmap, wherein the bitmap indicates whether the normal barring configuration applies to each of the at least one special access identity.

Example 5 is the method of Example 4, wherein the at least one special access identity comprises a first special access identity indicating the UE is configured for Multimedia Priority Service (MPS), and a second special access identity indicating the UE is configured for Mission Critical Service (MCS).

Example 6 is the method of Example 5, wherein the bitmap comprises a first bit and a second bit, wherein the first bit indicates whether the normal barring configuration applies to the first special access identity, and wherein the second bit indicates whether the normal barring configuration applies to the second special access identity.

Example 7 is the method of Example 6, wherein the at least one barring information comprises first barring information and second barring information, wherein the first barring information provides barring configurations for UEs with access identities that are not from the access identity set, and wherein the normal barring configuration comprises a second barring factor and a second barring time from the second barring information.

Example 8 is the method of Example 6, wherein the at least one barring information comprises first barring information, wherein the first barring information comprises a first barring factor, a first barring time and an offset information, and wherein the normal barring configuration is a computation result from the first barring factor, the first barring time and the offset information.

Example 9 is the method of Example 4, wherein performing an access barring check based on the one or more messages comprises: determining, whether the at least one access identity of the UE comprises one of the at least one special access identity: performing, in response to a determination that the at least one access identity does not comprise the one of the at least one special access identity, performing the access barring check based on the normal barring configuration: and in response to a determination that the at least one access identity comprises the one of the at least one special access identity: determining, based on the bitmap, whether the normal barring configuration applies to the one of at least one special access identity: performing, in response to a determination that the normal barring configuration applies to the one of at least one special access identity, the access barring check based on the normal barring configuration: and determining, in response to a determination that the normal barring configuration does not apply to the one of at least one special access identity, that a result of the access barring check is not barred.

Example 10 is the method of Example 1, wherein the one or more messages comprise at least one barring information, wherein for each access identity from the access identity set, the at least one barring information provides a corresponding barring configuration, wherein the corresponding configuration comprises a corresponding barring factor and a corresponding barring time.

Example 11 is the method of Example 10, wherein the at least one barring information comprises first barring information and second barring information, wherein the first barring information provides barring configurations for UEs with access identities that are not from the access identity set, and wherein for each access identity, the corresponding barring factor and the corresponding barring time are from the second barring information.

Example 12 is the method of Example 10, wherein the at least one barring information comprises first barring information, the first barring information comprising a first barring factor and a first barring time, and wherein for each access identity, the first barring information further comprises at least one corresponding offset information selected from a group consisting of: a corresponding offset to the first barring factor; and a corresponding offset to the first barring time.

Example 13 is the method of Example 12, for each access identity: wherein the corresponding barring factor is a computation result from the first barring factor and the corresponding offset to the first barring factor, and/or wherein, the corresponding barring time is a computation result from the first barring time and the corresponding offset to the first barring time.

Example 14 is the method of Example 10, wherein for each access identity, the at least one barring information comprises corresponding barring information, wherein the corresponding barring information provides the corresponding barring configuration.

Example 15 is the method of Example 10, wherein performing an access barring check based on the one or more messages comprises: determining, based on the at least one access identity, at least one corresponding barring configuration: and performing the access barring check based on the at least one corresponding barring configuration.

Example 16 is the method of Example 1, wherein the at least one access identity is indicated by Non-Access Stratum (NAS) layer of the UE.

Example 17 is the method of Example 1, wherein the one or more messages provide different barring configurations for different access identities in the access identity set for each access category.

Example 18 is the method of Example 1, wherein the one or more messages comprise System Information Block Type1 (SIB1) or a new dedicated SIB.

Example 19 is a method by a base station (BS), comprising: determining one or more messages providing different barring configurations for different access identities in an access identity set, wherein the UE has at least one access identity, and wherein the at least one access identity is from the access identity set and indicates that the UE is a disaster inbound roamer with respect to the BS: and sending the one or more messages to the UE.

Example 20 is the method of Example 19, wherein the access identity set comprises a normal access identity and at least one special access identity.

Example 21 is the method of Example 20, wherein the one or more messages comprise at least one barring information, wherein the at least one barring information provides a normal barring configuration for the normal access identity.

Example 22 is the method of Example 21, wherein the at least one barring information further comprises a bitmap, wherein the bitmap indicates whether the normal barring configuration applies to each of the at least one special access identity.

Example 23 is the method of Example 22, wherein the at least one special access identity comprises a first special access identity indicating the UE is configured for Multimedia Priority Service (MPS), and a second special access identity indicating the UE is configured for Mission Critical Service (MCS).

Example 24 is the method of Example 23, wherein the bitmap comprises a first bit and a second bit, wherein the first bit indicates whether the normal barring configuration applies to the first special access identity, and wherein the second bit indicates whether the normal barring configuration applies to the second special access identity.

Example 25 is the method of Example 24, wherein the at least one barring information comprises first barring information and second barring information, wherein the first barring information provides barring configurations for UEs with access identities that are not from the access identity set, and wherein the normal barring configuration comprises a second barring factor and a second barring time from the second barring information.

Example 26 is the method of Example 24, wherein the at least one barring information comprises first barring information, wherein the first barring information comprises a first barring factor, a first barring time and an offset information, and wherein the normal barring configuration is a computation result from the first barring factor, the first barring time and the offset information.

Example 27 is the method of Example 19, wherein the one or more messages comprise at least one barring information, wherein for each access identity from the access identity set, the at least one barring information provides a corresponding barring configuration, wherein the corresponding configuration comprises a corresponding barring factor and a corresponding barring time.

Example 28 is the method of Example 27, wherein the at least one barring information comprises first barring information and second barring information, wherein the first barring information provides barring configurations for UEs with access identities that are not from the access identity set, and wherein for each access identity, the corresponding barring factor and the corresponding barring time are from the second barring information.

Example 29 is the method of Example 27, wherein the at least one barring information comprises first barring information, the first barring information comprising a first barring factor and a first barring time, and wherein for each access identity, the first barring information further comprises at least one corresponding offset information selected from a group consisting of: a corresponding offset to the first barring factor; and a corresponding offset to the first barring time.

Example 30 is the method of Example 29, for each access identity: wherein the corresponding barring factor is a computation result from the first barring factor and the corresponding offset to the first barring factor, and wherein, the corresponding barring time is a computation result from the first barring time and the corresponding offset to the first barring time.

Example 31 is the method of Example 27, wherein for each access identity, the at least one barring information comprises corresponding barring information, wherein the corresponding barring information provides the corresponding barring configuration.

Example 32 is the method of Example 19, wherein the at least one access identity is indicated by Non-Access Stratum (NAS) layer of the UE.

Example 33 is the method of Example 19, wherein the one or more messages provide different barring configurations for different access identities in the access identity set for each access category.

Example 34 is the method of Example 19, wherein the one or more messages comprise System Information Block Type1 (SIB1) or a new dedicated SIB.

Example 35 is an apparatus for a user equipment (UE), the apparatus comprising: one or more processors configured to perform steps of the method according to any of Examples 1-18.

Example 36 is an apparatus for a base station (BS), the apparatus comprising: one or more processors configured to perform steps of the method according to any of Examples 19-34.

Example 37 is a computer readable medium having computer programs stored thereon which, when executed by one or more processors, cause an apparatus to perform steps of the method according to any of Examples 1-34.

Example 38 is an apparatus for a communication device, comprising means for performing steps of the method according to any of Examples 1-34.

Example 39 is a computer program product comprising computer programs which, when executed by one or more processors, cause an apparatus to perform steps of the method according to any of Examples 1-34.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of operating circuitry to be implemented in a user equipment (UE), the method comprising:
   receiving, from a base station (BS), one or more messages that provide a unified access control (UAC) barring for access identities (AIs) associated with minimization of interruption (MINT) configuration, wherein the UAC barring includes a bitmap to provide different barring configurations for different access identities in an access identity set, wherein: the bitmap has a first value to indicate whether access attempts to the BS are allowed for MINT UEs with a first access identity associated with multimedia priority service (MPS) and a second value to indicate whether access attempts to the BS are allowed for MINT UEs with a second access identity associated with mission critical service (MCS); the UE has at least one access identity; and the at least one access identity is from the access identity set and indicates that the UE is a disaster inbound roamer with respect to the BS; and
   performing an access barring check based on the UAC barring for the AIs associated with the MINT configuration and the at least one access identity.

2. The method of claim 1, wherein the bitmap is a first bitmap and the method further comprises:
   receiving, from the BS, a UAC barring for AIs configuration that includes a second bitmap to indicate whether access attempts are allowed for each of a plurality of normal access identities.

3. The method of claim 2, wherein the first bitmap is a 2-bit bitmap and the second bitmap is a 7-bit bitmap.

4. The method of claim 1, wherein the bitmap is a 2-bit bitmap.

5. The method of claim 1, further comprising:
   receiving a normal barring configuration that includes a barring factor and a barring time.

6. The method of claim 1, further comprising:
   receiving barring information that includes a barring factor, a barring time, and offset information.

7. An apparatus comprising:
   processing circuitry to:
      receive, from a base station (BS), one or more messages that provide different barring configurations for different access identities in an access identity set that includes a normal access identity and at least one special access identity, wherein the apparatus has at least one access identity, and wherein the at least one access identity is from the access identity set and indicates that the apparatus is a disaster inbound roamer with respect to the BS; and
   perform an access barring check based on the one or more messages, wherein to perform the access barring check based on the one or more messages the processing circuitry is to:
      determine, whether the at least one access identity of the UE comprises one of the at least one special access identity;
      in response to a determination that the at least one access identity does not comprise the one of the at least one special access identity, perform the access barring check based on the normal barring configuration; and
      in response to a determination that the at least one access identity comprises the one of the at least one special access identity:
         determine, based on the bitmap, whether the normal barring configuration applies to the one of the at least one special access identity;
         in response to a determination that the normal barring configuration applies to the one of the at least one special access identity, perform the access barring check based on the normal barring configuration; and
         in response to a determination that the normal barring configuration does not apply to the one of the at least one special access identity, determine that a result of the access barring check is not barred; and
   an interface coupled with the processing circuitry to enable communication.

8. A method comprising:
   generating one or more messages providing a unified access control (UAC) barring for access identities (AIs) associated with minimization of interruption (MINT) configuration, wherein the UAC barring includes a bitmap to provide different barring configurations for different access identities in an access identity set, wherein: the bitmap has a first value to indicate whether access attempts to a base station (BS) are allowed for MINT user equipments (UEs) with a first access identity associated with multimedia priority service (MPS) and a second value to indicate whether access attempts to the BS are allowed for MINT UEs with a second access identity associated with mission critical service (MCS); and outputting the one or more messages for transmission to a UE.

9. The method of claim 8, wherein the bitmap is a first bitmap and the method further comprises:

generating a UAC barring for Als configuration that includes a second bitmap to indicate whether access attempts are allowed for each of a plurality of normal access identities; and outputting the UAC barring for Als configuration for transmission to the UE.

10. The method of claim 9, wherein the first bitmap is a 2-bit bitmap and the second bitmap is a 7-bit bitmap.

11. The method of claim 8, wherein the bitmap is a 2-bit bitmap.

* * * * *